United States Patent
Kuwabara et al.

(10) Patent No.: US 8,382,376 B2
(45) Date of Patent: Feb. 26, 2013

(54) SPLIT-TYPE SLIDING BEARING FOR CRANKSHAFT IN INTERNAL COMBUSTION ENGINE

(75) Inventors: Aisuke Kuwabara, Inuyama (JP); Osamu Ishigo, Inuyama (JP); Yasushi Saito, Inuyama (JP)

(73) Assignee: Daido Metal Company Ltd., Naka-Ku, Nagoya (JP)

( * ) Notice: Subject to any disclaimer, the term of this patent is extended or adjusted under 35 U.S.C. 154(b) by 540 days.

(21) Appl. No.: 12/647,151

(22) Filed: Dec. 24, 2009

(65) Prior Publication Data

US 2010/0166350 A1 Jul. 1, 2010

(30) Foreign Application Priority Data

Dec. 26, 2008 (JP) .................................. 2008-333844

(51) Int. Cl.
*F16C 9/02* (2006.01)
*F16C 33/02* (2006.01)
*F16C 35/00* (2006.01)

(52) U.S. Cl. ......... 384/294; 384/278; 384/429; 384/434

(58) Field of Classification Search .................. 384/288, 384/291, 294, 429, 430, 432, 433, 434; 123/195 R
See application file for complete search history.

(56) References Cited

U.S. PATENT DOCUMENTS

| 4,073,550 | A  | * | 2/1978 | Yahraus ......................... 384/288 |
| 6,082,904 | A  | * | 7/2000 | Ono et al. ...................... 384/291 |
| 6,089,756 | A  | * | 7/2000 | Ono et al. ...................... 384/322 |
| 6,120,187 | A  | * | 9/2000 | Ono et al. ...................... 384/273 |
| 6,422,755 | B1 | * | 7/2002 | Cadle et al. .................... 384/433 |
| RE39,613  | E  | * | 5/2007 | Niwa et al. ..................... 384/294 |
| 2005/0213859 | A1 | * | 9/2005 | Kuroda et al. ................ 384/291 |
| 2010/0119181 | A1 | * | 5/2010 | Ishigo et al. .................. 384/294 |

FOREIGN PATENT DOCUMENTS

| JP | 08210355 | 8/1996 |
| JP | 10175131 | 6/1998 |

* cited by examiner

*Primary Examiner* — Phillip A Johnson
(74) *Attorney, Agent, or Firm* — Browdy and Neimark, PLLC

(57) ABSTRACT

A split-type sliding bearing for a crankshaft is formed of a pair of semi-cylindrical bearings halves which are fitted between a pair of housing halves having respectively high and low thermal expansion coefficients, one of the pair of bearing halves being supported on the housing half having a low thermal expansion coefficient, and the other of the pair of bearing halves being supported on the housing half having a high thermal expansion coefficient. The circumferential end zones of the bearing half supported on the housing half having a high thermal expansion coefficient have a thickness which is greater than that of the circumferential end zones of the bearing half supported on the housing half having a low thermal expansion coefficient.

28 Claims, 6 Drawing Sheets

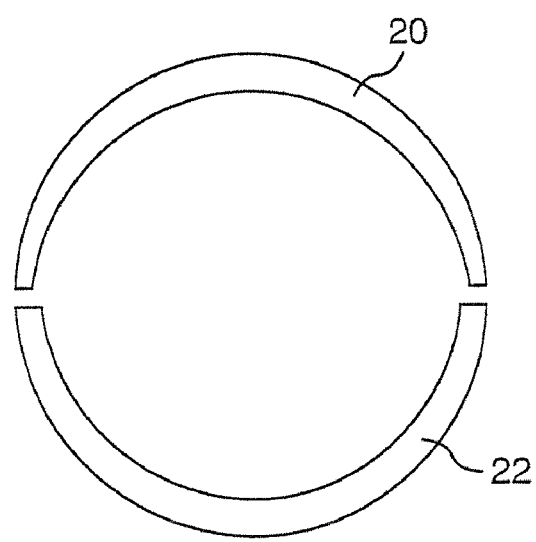

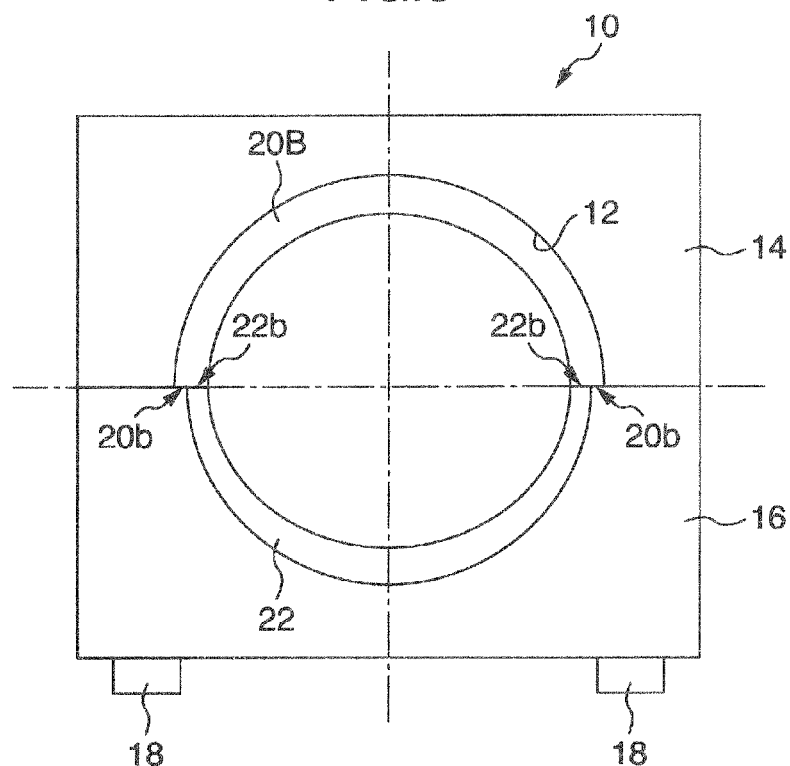
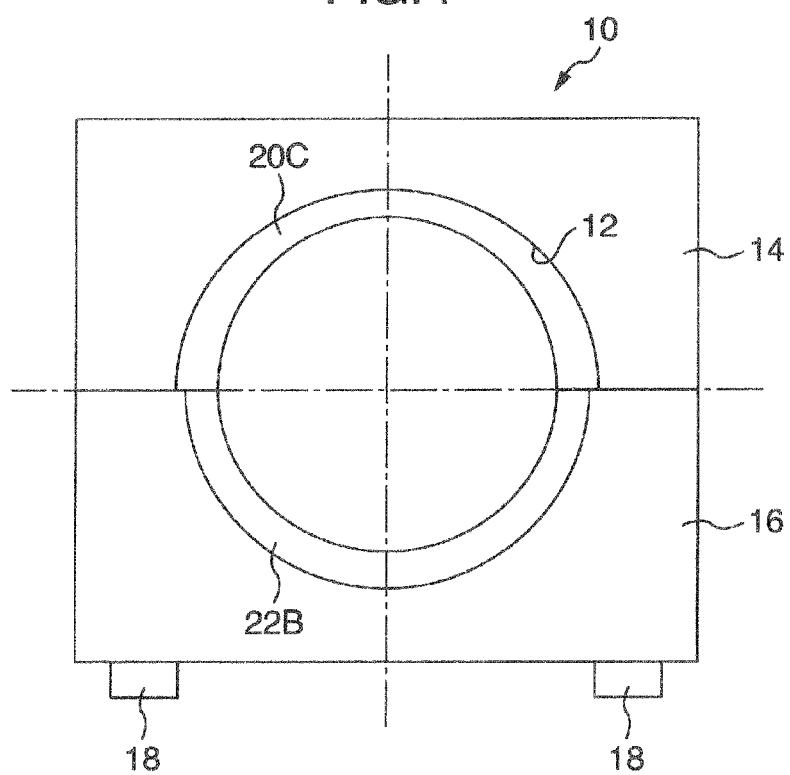

SPLIT-TYPE SLIDING BEARING FOR CRANKSHAFT IN INTERNAL COMBUSTION ENGINE

FIELD OF THE INVENTION

The present invention relates to a split-type sliding bearing for a crankshaft in an internal combustion engine, comprised of a pair of semi-cylindrical bearings which are mated to each other into a cylindrical bearing in use, and adapted to be accommodated, in use, into a split-type bearing housing having a cylindrical bearing retaining bore which are bi-split so as to be aligned with the pair of semi-cylindrical bearings in the mated condition thereof, and comprised of a pair of housing halves (refer to, for example, JP-A-08-210355 as Patent Document 1).

RELATED ART

A split-type sliding bearing for a crankshaft in an internal combustion engine, is comprised of a pair of semi-cylindrical bearings that are fitted respectively in a housing half which is a part of an engine block and a housing half which is a bearing cap, so as to be formed into a cylindrical body. A split-type bearing housing has a bearing retaining bore which is formed into a true-circular sectional shape, by a single working process of machining the pair of the housing halves that are mated with each other by fastening bolts before the pair of semi-cylindrical bearings are fitted therein.

Further, these years, there has been, in general, used an engine block made of aluminum alloy in an internal combustion engine for a passenger vehicle in order to reduce the weight of the internal combustion engine. In this case, a split-type bearing housing for a crankshaft in the internal combustion engine is in general comprised of a pair of housing halves one of which is a part of the engine block made of aluminum alloy, and the other one of which is a bearing cap made of iron alloy.

Meanwhile, each of the semi-cylindrical bearings of a split-type sliding bearing is, in general, comprised of a steel back plate and a bearing alloy layer. The outer surface of the split-type sliding bearing comprised of the pair of semi-cylindrical bearings has a circumferential length which is longer than the circumferential length of the inner surface of the split-type bearing housing by a predetermined value. With this dimensional relationship, when the pair of semi-cylindrical bearings are fitted in the split-type bearing housing, circumferential compressive stress is generated in the pair of semi-cylindrical bearings, and at the same time, radial stress is generated therein. Thus, the pair of semi-cylindrical bearings are fixed to the inner surface of the split-type bearing housing, being made into close contact therewith, and as well, the split-type bearing housing is subjected to elastic deformation so as to radially expand, resulting in an increase in its inner diameter.

The inner surface of the split-type sliding bearing comprised of the pair of semi-cylindrical bearings for a crankshaft, and the outer surface of the crankshaft define therebetween a bearing clearance for feeding lubrication oil. Should the bearing clearance become excessively larger, the crankshaft would incurs a play, resulting in vibration and noise generated from the internal combustion engine. Meanwhile, since the inner diameter of the bearing retaining bore in the split-type bearing housing and the outer diameter of the crankshaft are inevitably subjected to machining errors during manufacturing thereof, the space between the split-type bearing housing and the crankshaft causes unevenness. Thus, in order to set the bearing clearance between the inner surface of the split-type sliding bearing and the outer surface of the crankshaft to an appropriate value, a split-type sliding bearing having an appropriate wall thickness should be selected in order to restrain the unevenness of the bearing clearance.

However, as stated above, when the split-type sliding bearing is incorporated in the split-type bearing housing, the inner diameter of the split-type bearing housing is radially expanded and deformed. In the case of occurrence of the expansive deformation, the bearing clearance is increased from a designed bearing clearance which is determined by the inner diameter of the bearing retaining bore in the split-type bearing housing, and the outer diameter of the crankshaft and the wall thickness of the semi-cylindrical bearings, by a degree of the expansive deformation of the split-type bearing housing, resulting in unevenness due to the expansive deformation.

JP-A-10-175131 as Patent Document 2 proposes the configuration that the circumferential length of the outer surface of a split-type sliding bearing and the inner diameter of the bearing retaining bore in the split-type bearing housing are selectively combined so as to decrease unevenness which is inherent to the dimensions of the space between the split-type bearing housing and the crankshaft, and which is inherent to the expansive deformation of the split-type bearing housing, in order to reduce the unevenness of the bearing clearance.

A split-type bearing housing for a crankshaft in an internal combustion engine has a degree of stiffness which has been conventionally lowered in order to decrease the weight of an internal combustion engine. An engine block made of aluminum alloy has been broadly used with the purpose of decreasing the weight of the internal combustion engine.

Explanation will be hereinbelow made of the dimensional relationship between the split-type bearing housing and the split-type sliding bearing composed of a pair of semi-cylindrical bearings incorporated in the split-type bearing housing with reference to FIGS. 9 and 10.

Referring to FIG. 9 which shows the split-type bearing housing 01 for a crankshaft, the bearing housing 01 is comprised of a first housing half 02 which is a part of an engine block, and a second housing half 03 which is a bearing cap (made of, for example, iron alloy). After the first housing half 02 is mated with the second housing half 03 by bolts 04, a bearing retaining bore (05, 06) having a true-circular cross-sectional shape is formed by machining at a room temperature. Thereafter, during assembling of a bearing device, the bolts 04 are removed from the bearing housing 01, then, semi-cylindrical bearings 07, 08 constituting the split-type sliding bearing are fitted along the inner surface 05, 06 of the bearing retaining bore, and thereafter, the housing half 03 is mated with the housing half 02 by fastening the bolts 04 (refer to FIG. 10).

In this configuration in which no stepped difference is though present on the inner surface 05, 06 of the bearing retaining bore at the abutting end faces of the pair of semi-cylindrical bearings 07, 08, the inner diameter (05) of the housing half 02 on the engine block side made of aluminum alloy having a relative high thermal expansion coefficient becomes larger than the inner diameter (06) of the housing half 03 on the bearing cap side made of iron alloy which has a relatively low expansion coefficient when the temperature of the split-type bearing housing is increased during operation of the internal combustion engine, since the aluminum alloy and the iron alloy have different thermal expansion coefficients, and as a result, a stepped difference (refer to reference mark G in FIG. 10) is caused, due to a difference between degrees of thermal expansion, at the inner surface of the split-type bearing housing at the split surfaces thereof. Thus, a stepped difference (g) is also caused at the inner surface of the bearing, between the abutting end faces of the semi-cylindrical bearings 07, 08.

Meanwhile, in these years, an oil pump in an internal combustion engine has been miniaturized, and accordingly, the supply quantity of lubrication oil onto the inner surface of a sliding bearing for a crankshaft has been decreased. Accordingly, the bearing clearance between the inner surface of the sliding bearing and the outer surface of the crankshaft is set to be small in order to reduce the amount of leakage of the lubrication oil from the bearing clearance. Thus, if the stepped difference is caused on the inner surface of the sliding bearing between the abutting end faces of the semi-cylindrical bearings 07, 08, the ratio of the area of the stepped difference which inevitably causes a barrier against the lubrication oil becomes large, relative to the sectional area of the passages for the lubrication oil, in comparison with a conventional bearing clearance which is set to be larger, and as a result, the stepped difference (g) incurs a wiping event with respect to the lubrication oil. Thus, the quantity of leakage of lubrication oil has been increased, resulting in occurrence of inferior supply of lubrication oil to the sliding surface of the bearing.

Patent Document 2 proposes measures for decreasing the bearing clearance between the inner surface of a sliding bearing and the outer surface of a shaft in order to enhance the silence of an internal combustion engine. However, this document fails to consider the problem that a stepped difference is caused on the inner surface of the bearing between the abutting end faces of a pair of semi-cylindrical bearings fitted between a pair of housing halves constituting a split-type bearing housing and having different thermal expansion coefficient, when the temperature of the split-type bearing housing is increased during operation of the internal combustion engine.

SUMMARY OF THE INVENTION

Thus, an object of the present invention is to solve the problem that a wiping event as to lubrication oil is caused due to occurrence of a stepped difference at the inner surface of a bearing between abutting end faces of semi-cylindrical bearings which are fitted between a pair of housing halves constituting a split-type bearing housing for a crankshaft in an internal combustion engine and having different thermal expansion coefficients, when the temperature of the split-type bearing housing is increased during operation of the internal combustion engine.

To the end, according to a first aspect of the present invention, there is provided a split-type sliding bearing for a crankshaft in an internal combustion engine, in which a pair of semi-cylindrical bearings are mated with each other into a cylindrical body in use, and which is adapted to be accommodated in a split-type bearing housing having a cylindrical bearing retaining bore which is bi-split so as to be mated with the pair of semi-cylindrical bodies in the mated condition of the latter, characterized in that:

the split-type bearing housing is comprised of a housing half having a relatively high thermal expansion coefficient, and a housing half having a relatively low thermal expansion coefficient, a first semi-cylindrical bearing which is one of the pair of semi-cylindrical bearings, and which is fitted in the housing half having a high thermal expansion coefficient, and a second semi-cylindrical bearing which is the other one of the pair of semi-cylindrical bearings, and which is fitted in the housing half having a high thermal expansion coefficient, have the following dimensional relationship therebetween in a preinstalled condition:

(1) the first and second semi-cylindrical bearings have an equal outer diameter dimension, and (2) circumferential opposite end parts of the first semi-cylindrical bearing have a thickness which is larger than that of the circumferential opposite end parts of the second semi-cylindrical bearing, whereby the inner surfaces of the first and second semi-cylindrical bearings which are incorporated between the pair of housing halves mated by fastening bolts are aligned with each other at their abutting end faces even though a stepped difference is caused between the abutting end faces of the pair of housing halves, due to a difference between degrees of thermal expansion of both housing halves, which is upon the different thermal expansion coefficients of both housing halves, when the temperature of the housing halves is increased during operation of the internal combustion engine.

Explanation will be hereinbelow made of the above-mentioned alignment between the inner surfaces:

The above-mentioned alignment does not have the meaning of geometrically complete alignment between both inner surfaces of the semi-cylindrical bearings. That is, the difference between the thicknesses of the semi-cylindrical bearings at the abutting end faces thereof, is set to a value which is a half of a difference in thermally expansive deformation of the bearing retaining bore between both housing halves at their abutting end faces, which difference is calculated by using, for example, the following formula for calculating the thermal expansion difference, when the temperature of the housing halves is increased during operation of the internal combustion engine, and in addition, errors which are determined by machining accuracy during manufacturing of the split-type sliding bearing and the split-type bearing housing are involved:

$$\Delta D = D \times (T2-T1) \times (\alpha 1 - \alpha 2) \times k \qquad \text{Formula I}$$

where $\Delta D$ is a difference between degrees of thermal expansive deformation (mm), D is an inner diameter of the bearing retaining bore (mm), T1 is a temperature of the split-type bearing housing during machining the bearing retaining bore therein (deg.C), T2 is a temperature of the split-type bearing housing during steady-state operation of the internal combustion engine (deg.C), $\alpha$1 is a thermal expansion coefficient of the split-type bearing housing on the high thermal expansion coefficient side ($K^{-1}$), $\alpha$2 is a thermal expansion coefficient of the split-type bearing housing on the low thermal coefficient side ($K^{-1}$), and K is a relaxation coefficient of the difference between thermal expansive deformation due to the fastening of bolts.

In a first embodiment of the sliding bearing according to the present invention, the first semi-cylindrical bearing has a wall thickness which is uniform over the entire circumferential length thereof.

In a second embodiment of the sliding bearing according to the present invention, the first semi-cylindrical bearing has a wall thickness which is increased from the circumferential center part to the abutting end faces thereof.

In a third embodiment of the sliding bearing according to the present invention, the second semi-cylindrical bearing has a wall thickness which is uniform over the entire circumferential length thereof.

In a fourth embodiment of the sliding bearing according to the present invention, the second semi-cylindrical bearing has a wall thickness which is decreased from the circumferential center part to the abutting end faces thereof.

In a fifth embodiment of the sliding bearing according to the present invention, at least the second semi-cylindrical bearing has multi circumferential grooves formed in the inner surface thereof and extended circumferentially thereof, and the circumferential grooves which are formed in circumferential end zones of the second semi-cylindrical bearing, including respectively two circumferential end faces of the second semi-cylindrical bearing, have a depth which is in a range from 5 to 20 μm.

In a sixth embodiment of the sliding bearing according to the present invention, the first semi-cylindrical bearing has multi circumferential grooves formed in the inner surface thereof and extended circumferentially thereof, and the circumferential grooves formed in circumferential end zones of the first semi-cylindrical bearing, including respectively two circumferential ends of the first semi-cylindrical bearing, have a depth which is in a range from 5 to 20 μm.

In a seventh embodiment of the sliding bearing according to the present invention, the circumferential end zones in the inner surface of the first semi-cylindrical bearing is in a range defined by a circumferential length which corresponds to a circumferential angle of at least 10 deg. but 50 deg. at maximum, measured from the circumferential end faces as a starting point.

In an eighth embodiment of the sliding bearing according to the present invention, the inner surface of the first semi-cylindrical bearing has a degree of surface roughness which is not higher than 3.2 μmRz, except the circumferential end zones.

In a ninth embodiment of the sliding bearing according to the present invention, the circumferential grooves in the first semi-cylindrical bearing have pitches which is from 0.3 mm to 1.5 mm.

In a tenth embodiment of the sliding bearing according to the present invention, the depth of the circumferential grooves formed in the inner surface of the second semi-cylindrical bearing is equal to or greater than a degree of a stepped difference caused between the abutting end faces of the first and second semi-cylindrical bearings.

According to a second aspect of the present invention, there is provided a sliding bearing device for a crankshaft in an internal combustion engine, comprising:

a split-type sliding bearing in which a pair of semi-cylindrical bearings are mated with each other into a cylindrical body in use, for a crankshaft in an internal combustion engine, a split-type bearing housing having a cylindrical bearing retaining bore which is bi-split so as to be aligned with the pair of semi-cylindrical bearings in the mated condition, for accommodating and retaining the pair of semi-cylindrical bearings in the bearing retaining bore, characterized in that:

the split-type bearing housing is comprised of a housing half having a relatively high thermal expansion coefficient and a housing half having a relatively low thermal expansion coefficient, a first semi-cylindrical bearing which is one of the pair of semi-cylindrical bearings and which is fitted in the housing half having a relatively high thermal expansion coefficient, and a second semi-cylindrical bearing which is the other one of the pair of semi-cylindrical bearings and which is fitted in the housing half having a relatively low thermal expansion coefficient, have the following dimensional relationship therebetween in a preinstalled condition:

(1) the first and second semi-cylindrical bearings have an equal outer diameter dimension, and (2) circumferential opposite end parts of the first semi-cylindrical bearing have a thickness which is larger than that of the circumferential opposite end parts of the second semi-cylindrical bearing, whereby the inner surfaces of the first and second semi-cylindrical bearings which are incorporated between the pair of housing halves mated by fastening bolts are aligned with each other at their abutting end faces even though a stepped difference is caused between the abutting end faces of the pair of housing halves, due to a difference between degrees of thermal expansion of both housing halves, being based upon a difference between the thermal expansion coefficients of both housing halves, when the temperature of the housing halves is increased during operation of the internal combustion engine.

In the split type sliding bearing, according to the present invention, that is used being fitted in the split-type bearing housing for a crankshaft in an internal combustion engine, which is comprised of a pair of housing halves having thermal expansion coefficients that are different from each other, even though a stepped difference (refer to reference mark G in FIG. 10) is caused due to a thermal expansion difference between the pair of housing halves, which is caused in the inner diameter of the bearing retaining bore at the abutting end faces of the pair of housing halves (the split surfaces of the split-type bearing housing) when the temperature of the housing halves is increased during operation of the internal combustion engine, substantially no stepped difference is caused between the abutting end faces of the pair of semi-cylindrical bodies which are retained in the bearing retaining bore, different from a conventional split-type sliding bearing. It is because the thickness of the abutting end parts of the semi-cylindrical bearing fitted in the housing half having a high expansion coefficient is set to be larger than that of the abutting end parts of the semi-cylindrical bearing bearing fitted on the housing half having a low thermal expansion coefficient, and accordingly, by appropriately setting a difference between the thicknesses, the stepped difference caused between the abutting end faces of the pair of housing halves can be substantially offset.

Explanation will be hereinbelow made of preferred embodiments of the present invention with reference to the accompanying drawings which are:

BRIEF DESCRIPTION OF SEVERAL VIEW OF THE DRAWING

FIG. 1 is a front view illustrating a split-type sliding bearing in accordance with an embodiment 1 of the present invention, fitted in a split-type bearing housing for a crankshaft in an internal combustion engine, comprised of a pair of housing halves having thermal expansion coefficients which are different from each other, in a condition in which the temperature of the housing halves is increased during operation of the internal combustion engine;

Figure 5:
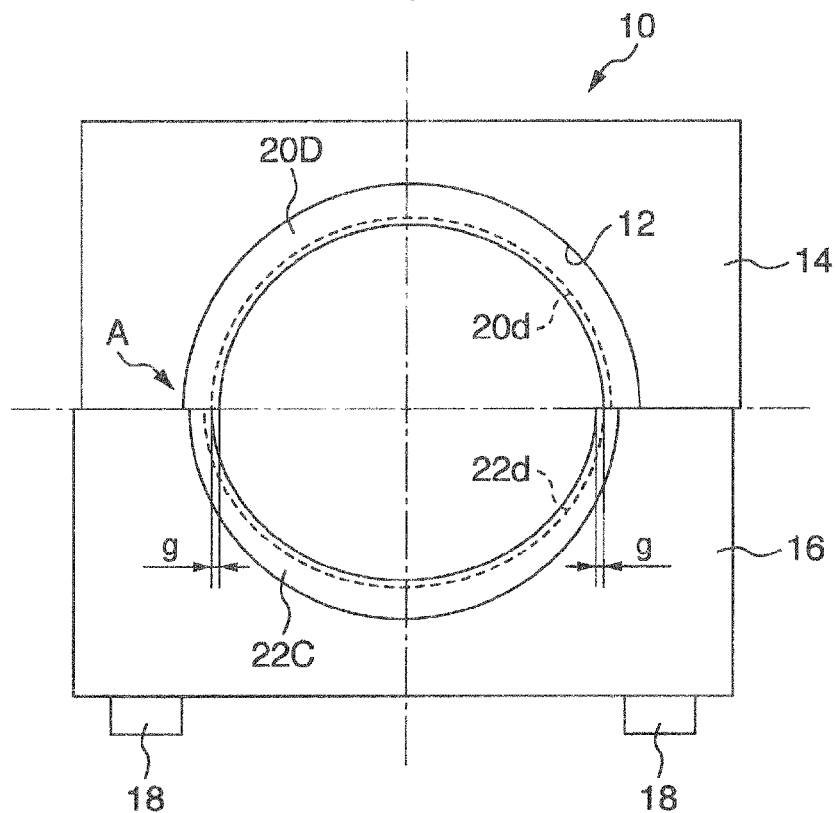
Figure 6:
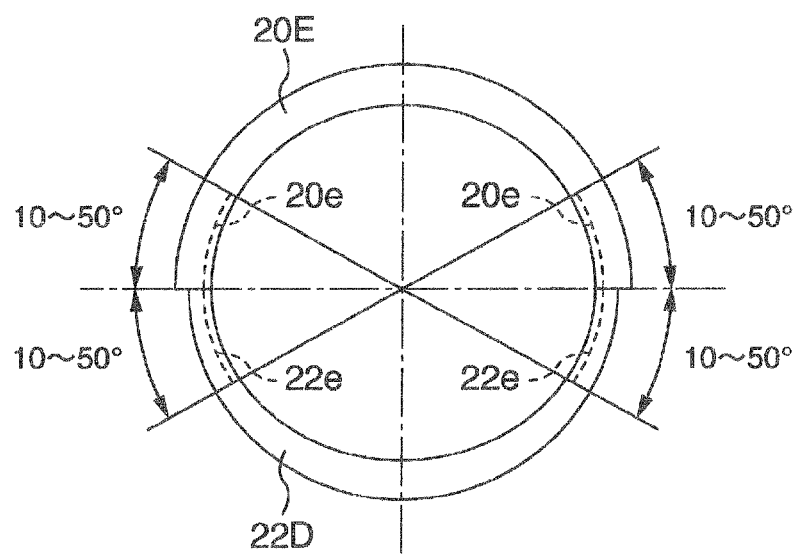
Figure 7:
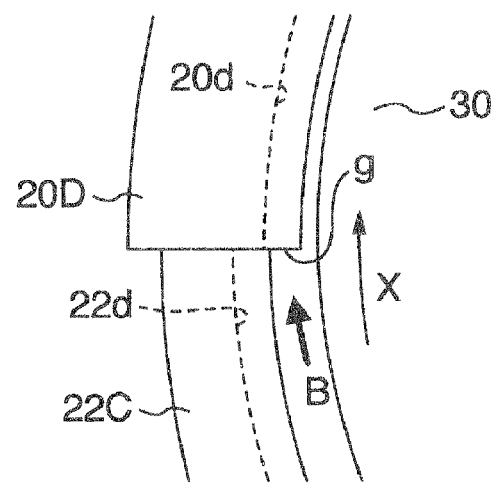
Figure 8:
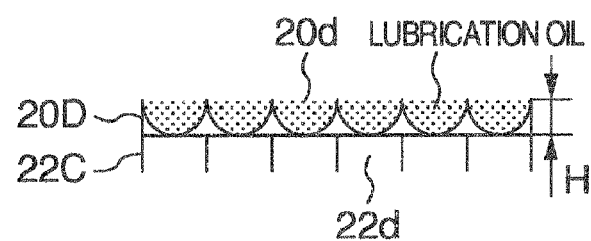
Figure 9:
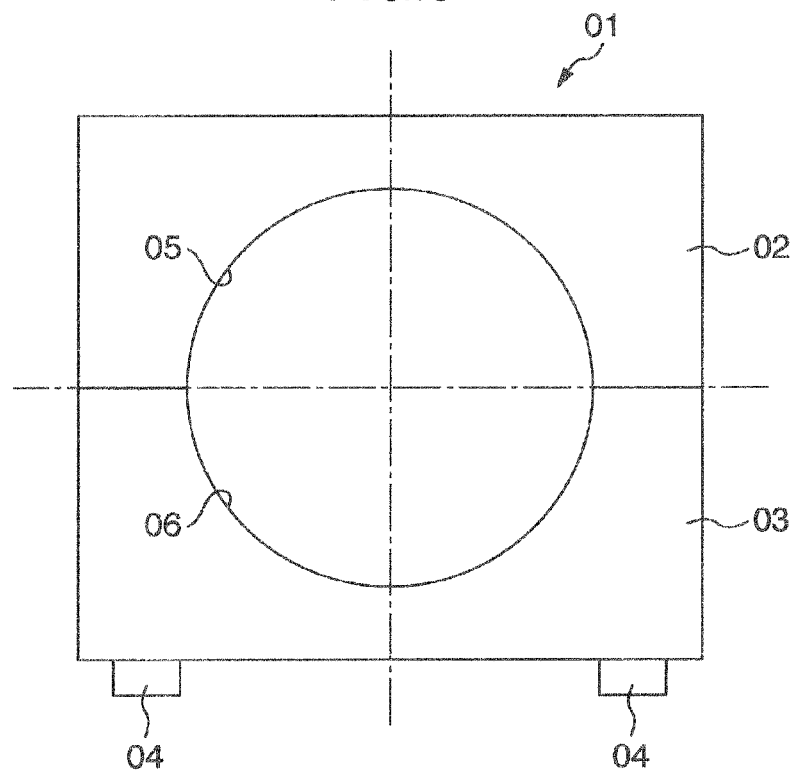
Figure 10:
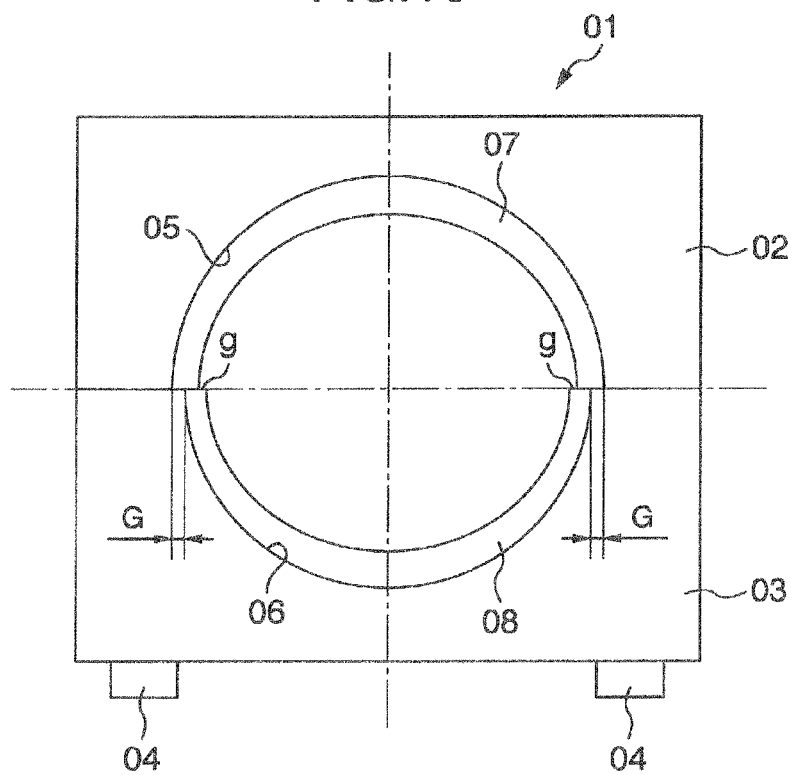

FIG. 3 is a front view illustrating a split-type sliding bearing in accordance with an embodiment 2 of the present invention, fitted in a split-type bearing housing for a crankshaft in an internal combustion engine, comprised of a pair of housing halves having thermal expansion coefficients which are different from each other, in a condition in which the temperature of the housing halves is increased during operation of the internal combustion engine;

FIG. 4 is a front view illustrating a split-type sliding bearing in accordance with an embodiment 3 of the present invention, fitted in a split-type bearing housing for a crankshaft in an internal combustion engine, comprised of a pair of housing halves having thermal expansion coefficients which are different from each other, in a condition in which the temperature of the housing halves is increased during operation of the internal combustion engine;

FIG. 5 is a front view illustrating a split-type sliding bearing in accordance with an embodiment 4 of the present invention, fitted in a split-type bearing housing for a crankshaft in an internal combustion engine, comprised of a pair of housing halves having thermal expansion coefficients which are different from each other, in a condition in which the temperature of the housing halves is increased during operation of the internal combustion engine;

FIG. 6 is a front view illustrating a split-type sliding bearing in accordance with an embodiment 5 of the present invention, fitted in a split-type bearing housing for a crankshaft in an internal combustion engine, comprised of a pair of housing halves having thermal expansion coefficients which are different from each other, in a condition in which the temperature of the housing halves is increased during operation of the internal combustion engine;

FIG. 7 is an enlarged view illustrating a portion shown in FIG. 5, in which a stepped difference is formed;

FIG. 8 is a cross-sectional view illustrating circumferential grooves formed in the inner surface of a semi-cylindrical bearing which constitutes the split-type sliding bearing explained in the embodiment 4, as viewed at a circumferential end face of the semi-cylindrical bearing:

FIG. 9 is a view for explaining a conventional example, illustrating a split-type bearing housing comprised of a pair of housing halves having thermal expansion coefficients which are different from each other, in an assembled condition; and FIG. 10 is a view for explaining a conventional example, illustrating a split-type sliding bearing comprised of a pair of semi-cylindrical bearings, which is incorporated in the split-type bearing housing shown in FIG. 9 in a condition in which the temperature of the housing halves is increased during operation of the internal combustion engine.

DESCRIPTION OF THE PREFERRED
EMBODIMENTS OF THE INVENTION (Embodiment 1)

Figure 1:
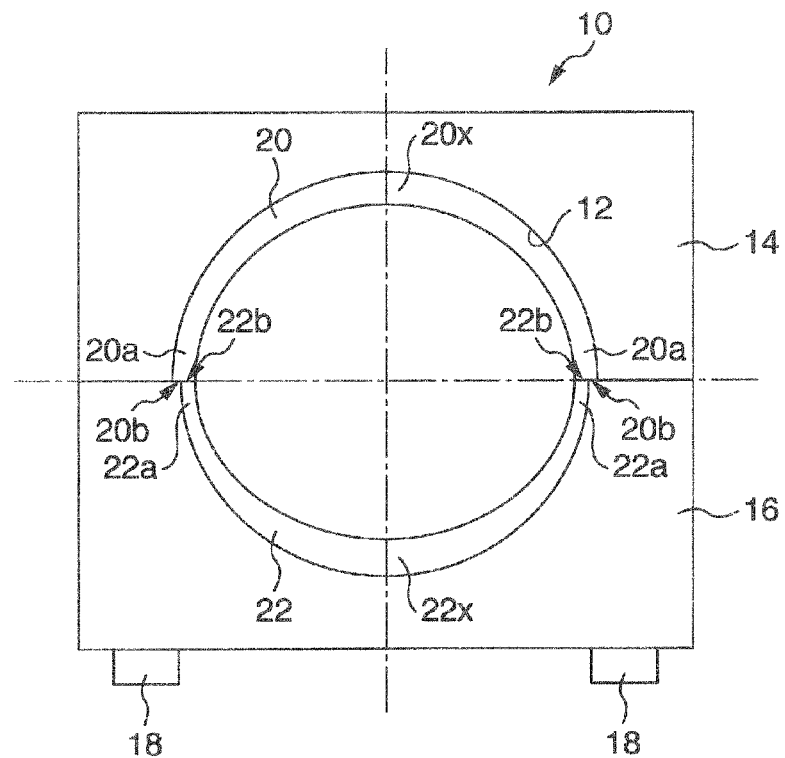
FIG. 1a is a view showing first and second semi-cylindrical bearing parts in a preinstalled condition.

Referring to FIG. 1 which is a front view illustrating a split-type sliding bearing composed of a pair of semi-cylindrical bearings 20, 22 and fitted in a bearing retaining bore of a split-type bearing housing 10 for a crankshaft in an internal combustion engine, the split-type bearing housing 10 is comprised of a housing half 14 having a relatively high thermal expansion coefficient, which is a part of an engine block made of aluminum alloy, and a housing half 16 having a relatively low thermal expansion coefficient, which is a bearing cap made of iron alloy, and both housing halves 14, 16 are integrally mated with each other by fastening bolts 18. The bearing retaining bore 12 in the split-type bearing housing 10 is a cylindrical bore having a true-circular cross-sectional shape, and is formed by machining the housing halves 14, 16 in the condition that the housing halves 14, 16 are mated with each other by fastening the bolts 18 without fitting therebetween the split-type sliding bearing.

FIG. 1 shows the configuration that the housing halves 14, 16 are mated with each other by refastening bolts 18, the semi-cylindrical bearings 20, 22 having been beforehand fitted in the inner surfaces of the housing halves 14, 16 after the split-type bearing housing 10 in which the bearing retaining bore 12 is formed by machining as stated above, is disassembled.

The semi-cylindrical bearings 20, 22 have an equal outer diameter in an initial condition, but have wall thicknesses which are different from each other at their abutting end parts 20a, 22a. That is, the relationship between the wall thicknesses is such that the wall thickness of the abutting end part 20a is larger than that of the abutting end parts 22a. Further, the wall thicknesses of the semi-cylindrical bearings 20, 22 are largest in their circumferential center parts 20x, 22x thereof and are smaller and smaller toward the abutting end parts 20b, 22b.

However, although no stepped difference is caused between the abutting end faces 20b, 22b of the semi-cylindrical bearings 20, 22 when the housing halves 14, 16 are integrally mated with each other by fastening the bolts 18, when the temperature of the housing halves 14, 16 are increased during operation of the internal combustion engine, there would be possibly caused a stepped difference (g) as shown in FIG. 10 between the abutting end faces 20b, 22b of the both semi-cylindrical bearings 20, 22 due to the fact that the inner diameter of the bearing retaining bore 12 differs between both housing halves 14, 16 since the degree of thermal expansion of the housing half 14 having a relatively high thermal expansion coefficient at the abutting end part thereof is larger than that of the housing half 16 having a relatively low thermal expansion coefficient at the abutting end part thereof, as stated hereinabove (refer to FIG. 10). However, in this embodiment, the semi-cylindrical bearings 20, 22 have an equal diameter in their initial condition while the wall thickness of the abutting end part 20a is larger than that of the abutting end part 22a, and accordingly, it is designed that the inner surfaces of both semi-cylindrical bearings 20, 22 are aligned with each other at the abutting end parts 20a, 22a thereof in order to cause the abutting end faces 20b, 22b to fall into the condition as shown in FIG. 1 when the temperature of the housing halves 14, 16 are increased during operation of the internal combustion engine. Thus, the wiping event as to the lubrication oil can hardly occur.

In order to actually align the inner surfaces of the semi-cylindrical bearings 20, 22 with each other as stated above, there may be used the split-type bearing housing 10 (a cylinder block and a bearing cap) itself, or a model of a part of the split-type bearing housing, which is made to mimic the split-type bearing housing.

The pair of semi-cylindrical bearings having the same shape and the same dimension are heated up to a temperature equal to the temperature of an internal combustion engine during steady-state operation in the condition that both housing halves are mated with each other by fastening bolts after the semi-cylindrical bodies are fitted in the bearing retaining bore in the split-type bearing housing, and then, a value of a difference in inner diameter between the pair of semi-cylindrical bearings is measured at the abutting end faces thereof with the use of a measuring instrument such as a roundness measuring unit or the like.

With the use of the thus measured value, the wall thickness of the circumferential end parts of the semi-cylindrical bearing to be fitted in the housing half having a relatively high thermal expansion coefficient can be set to a value which is larger than that of the circumferential end parts of the semi-cylindrical bearing to be fitted in the housing half having a relatively low thermal expansion coefficient by the measured value of the difference which has been actually measured with the split-type bearing housing or the model hereof.

Alternatively, in a convenient way, the wall thickness of the circumferential end parts of the semi-cylindrical bearing to be fitted in the housing half having a relatively high thermal expansion coefficient is set to a value which is larger than that of the circumferential end parts of the semi-cylindrical bearing to be fitted in the housing half having a relatively low thermal expansion coefficient by a value which is a half of the thermal expansion difference in the inner diameter of the bearing retaining bore of the split-type bearing housing, which is calculated with the use of Formula 1 as stated hereinabove.

The inner diameter (D mm) of the bearing retaining bore is the value measured at a temperature (T1 deg.C) during machining of the bearing retaining bore in the split-type bearing housing. It is noted that the machining of the bearing retaining bore is usually carried out at a temperature in a room temperature. Further, the temperature (T2 deg.C) of the split-type bearing housing during steady-state operation of the internal combustion engine is usually about 130 deg.C in the case of an internal combustion engine for a passenger vehicle which is generally used, although it is different dependent upon a type of an internal combustion engine. Further, since the housing halves having different thermal expansion coefficients are mated with each other by fastening bolts, compressive stress is induced at the abutting end faces of the housing halves, normal to the abutting end faces thereof, and accordingly, the abutting end faces of the housing half having a relatively low expansion coefficient serves as a resistance against the thermally expansive deformation of the abutting end faces of the housing half having a relatively high thermal expansion coefficient. In the case of the combination of housing halves respectively made of aluminum alloy and iron alloy which have different thermal expansion coefficients, the difference between degrees of thermally expansive deformation as to the inner diameter of the bearing retaining bore is reduced at the split surfaces of the split type bearing housing to about $\frac{1}{3}$ of the difference between degrees of thermal expansive deformation of the respective housing halves which thermally expand in a free state (relaxation coefficient of thermally expansive deformation K=$\frac{1}{3}$).

Calculation Example

The bearing retaining bore having an inner diameter of 60 mm is formed in a split-type bearing housing comprised of a housing half made of aluminum alloy (having a thermal expansion coefficient of $23 \times 10^{-6}$ $(K^{-1})$) and a housing half made of iron alloy (having a thermal expansion coefficient of $12 \times 10^{-6}$ $(K^{-1})$) which are mated with each other by fastening iron alloy bolts. If the bearing retaining bore is machined at a temperature of 25 deg.C. and if the temperature of the internal combustion engine is 130 deg.C. during steady-state operation thereof, the difference in thermally expansive deformation is calculated as 60 mm×(130 deg.C−25 deg.c)×($23 \times 10^{-6}$ $(k^{-1})$−$12 \times 10^{-6}$ $(K^{-1})$)×$\frac{1}{3}$=0.023 mm. The wall thickness of both circumferential end parts of the semi-cylindrical bearing fitted in the housing half having a relatively high thermal expansion coefficient is set to be smaller than that of the circumferential end parts of the semi-cylindrical bearing fitted in the housing half having a relatively low thermal expansion coefficient by 0.0115 mm which is a half of the above-mentioned difference (0.023 mm) in thermally expansive deformation.

As stated hereinabove, explanation has been made of such that the inner surfaces of both semi-cylindrical bearings are aligned with each other at their abutting end faces 20b, 22b.

However, it is noted that the above-mentioned alignment therebetween does not have the meaning of geometrically complete alignment therebetween. It is because there are caused machining errors during manufacturing of both semi-cylindrical bearings, and during machining of the bearing retaining bore in the split-type bearing housing, and because a slight positional deviation is caused between the abutting end faces 20b, 22b when the housing halves are again mated with each other by fastening the bolts after the both semi-cylindrical bearings are fitted in the split-type bearing housing. Thus, a stepped difference within 5 μm (that is, ±5 μm) should be allowed in the radial direction on the abutting end faces of both semi-cylindrical bearings.

In this embodiment, explanation has been made of the split-type sliding bearing of the type which are most commonly known as a split-type sliding bearing for an internal combustion engine and in which both semi-cylindrical bearings have a wall thickness (20x, 22x) which is largest in the circumferential center parts thereof and which is smaller and smaller toward the circumferential end faces thereof. However, the present invention should not be limited to this type. For example, the present invention may be also applied to a split-type sliding bearing of the type that both semi-cylindrical bearings have a wall thickness which is uniform over the entire circumferential length thereof, of the type that the semi-cylindrical bearings have the wall thickness which is smallest in the circumferential center part thereof and which is larger and larger toward the circumferential end faces thereof, of the type that the inner surfaces of both semi-cylindrical bearings are formed of a plurality of circular arc surfaces having different curvatures, or of the type that a split-type sliding bearing including a pair of semi-cylindrical bearings of types which are different from each other are combined with each other as far as the inner surfaces of both semi-cylindrical bearings are aligned with each other at the circumferential end faces thereof when the temperature of the housing halves 14, 16 which are mated with each other after both semi-cylindrical bearings are fitted in the split-type bearing housing is increased during operation of the internal combustion engine.

Figure 2:
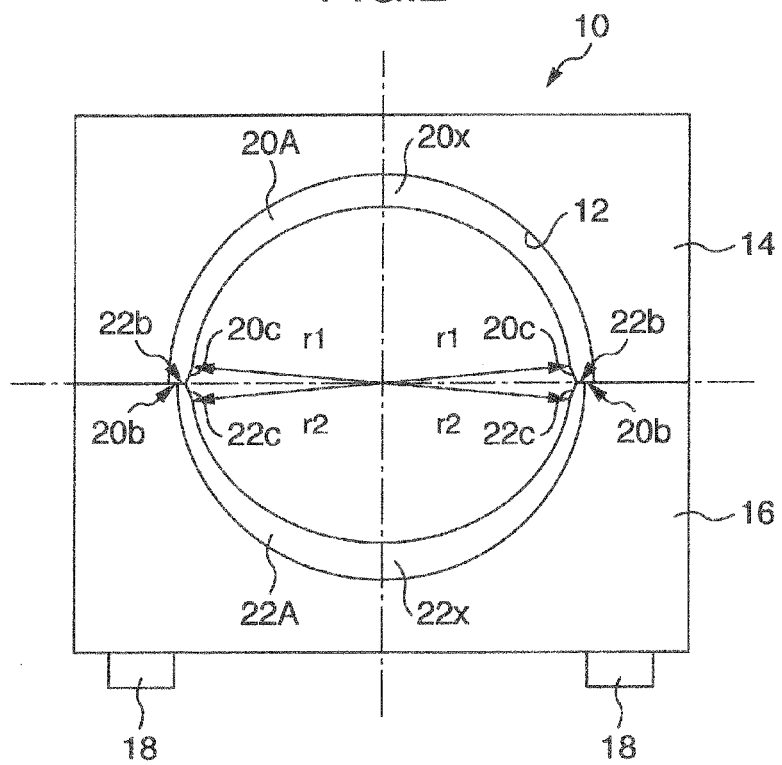
FIG. 2 is a view similar to FIG. 1, illustrating the split-type sliding bearing shown in FIG. 1, and formed therein with crush relives.

Further, similar to conventional semi-cylindrical bearings, the semi-cylindrical bearings 20A, 22A may be formed in both circumferential end parts thereof with crush relieves (20c, 22c, that is, portions in which the inner diameter is increased as shown in FIG. 2). In the case of the provision of the crush relieves, the value of radii (r1, r2) measured from the center of the bearing and at positions directly adjacent to the crush relieve forming zones of the inner surface of both semi-cylindrical bearings fitted respectively in the housing half having a relatively high thermal expansion coefficient and the housing half having a relatively low thermal expansion coefficient are set to be equal to each other (that is, r1=r2 as shown in FIG. 2).

(Embodiment 2)

Explanation will be hereinbelow made of a second embodiment of the present invention with reference to FIG. 3, wherein the split-type bearing housing 10 the same as that explained in the embodiment 1 is used. FIG. 3 shows the condition in which a pair of semi-cylindrical bearings 20B, 22, that is, the semi-cylindrical bearing 20B having a wall thickness which is uniform circumferentially thereof, and fitted in the housing half 14 having a relatively high thermal expansion coefficient and made of aluminum alloy, and the semi-cylindrical bearing 22 (which has the same configuration as that of the semi-cylindrical bearing 22 in the embodiment 1 as shown in FIG. 1) having a wall thickness which is largest in the circumferentially center part thereof and which is smaller and smaller toward the abutting end faces 22b and fitted in the housing half 16 having a relatively low thermal expansion coefficient, have their inner surfaces which are aligned with each other at the circumferential end faces thereof when the temperature of the housing halves 14, 16 are increased during operation of the internal combustion engine after both housing halves 14, 16 are mated with each other by fastening bolts. With this configuration, the clearance between the inner surface of the semi-cylindrical bearing 20B fitted in the housing half 14 having a relatively high thermal expansion coefficient and a large degree of expansive deformation and the outer surface of a shaft to be supported (which is not shown) can be set to be small over the entire inner surface of the semi-cylindrical bearing 20B, and accordingly, it is possible to effectively prevent occurrence of leakage of lubrication oil. It is noted, in this case, although no specific restriction is presented to the configuration of the semi-cylindrical bearing 22 fitted in the housing half 16 having a relatively low thermal expansion coefficient as far as the inner surfaces of the semi-cylindrical bearings are aligned with each other at the abutting end faces thereof, it is preferable to use the semi-cylindrical bearing 22 having a wall thickness which is largest at the circumferentially center part thereof and which is smaller and smaller toward the circumferential end faces thereof since the bearing clearance becomes smaller in the circumferentially center part of the semi-cylindrical bearing which affect at maximum the silence during operation of the internal combustion engine.

[Embodiment 3]

Explanation will be made of a third embodiment of the present invention with reference to FIG. 4, wherein a split-type bearing housing 10 is comprised of a pair of housing halves 14, 16 which are mated with other by fastening bolts 18. There would be possibly caused the elastic deformation that the inner diameter of the housing half 14 having a relatively high thermal expansion coefficient and also having a relatively low stiffness is enlarged at the abutting end faces thereof by a stress induced during the fastening of the bolts, and accordingly, the bearing retaining bore becomes elliptic, that is, the inner diameter of the split-type bearing housing is smaller in the direction orthogonal to a virtual plane including the abutting end faces. In this case, the bearing clearance defined between the inner diameter of the semi-cylindrical bearing 22C fitted in the housing half 14 having a high expansion coefficient 14 and the outer peripheral surface of the crankshaft as the shaft to be supported is gradually increased toward the circumferential end faces of the semi-cylindrical bearing, and as a result, the amount of leakage of lubrication oil from the enlarged part of the bearing clearance becomes larger. As a countermeasure to this problem, in this embodiment, the wall thickness of the semi-cylindrical bearing 20C fitted in the housing half 14 having a high thermal expansion coefficient is increased from the circumferentially center part to the circumferential end faces thereof. With the result, the bearing clearance is restrained from being increased so as to be maintained to be small even at the circumferential end parts of the semi-cylindrical bearing 20C.

The wall thickness of the semi-cylindrical bearing 22B fitted in the housing half 16 having a relatively low thermal expansion coefficient is uniform over the entire circumferential length thereof. Further the wall thickness of the semi-cylindrical bearing 22B is smaller than that of the circumferential end part of the semi-cylindrical bearing 20B.

Although no specific restriction is presented to the configuration of the semi-cylindrical bearing fitted in the housing half 16 having a relatively high expansion coefficient as far as the inner surface thereof at its circumferential end face is aligned with the inner surface of the semi-cylindrical bearing 20B at its circumferential end face, it is preferably use the semi-cylindrical bearing 22B having a wall thickness which is uniform over the entire circumferential length of the semi-cylindrical bearing in order to set the bearing clearance to a value which is as small as possible over the entire circumferential length so as to enhance the silence during operation of the internal combustion engine (refer to FIG. 4).

Explanation will be made of a fourth embodiment with reference to FIG. 5, wherein the circumferential end parts of a semi-cylindrical bearing 20D which is fitted in a housing half 14 having a relatively high thermal expansion coefficient and made of aluminum alloy have a wall thickness that is set to be larger than that of a semi-cylindrical bearing 22C which is fitted in a housing half 16 having a relatively low thermal expansion coefficient and made of iron alloy, and accordingly, the inner surfaces of the pair of semi-cylindrical bearings 20D, 22C are aligned with each other at the abutting end faces thereof when the temperature of the housing halves 14, 16 are increased during the operation of the internal combustion engine. However, machining errors are inevitably caused during manufacturing of the semi-cylindrical bearings and during machining of the bearing retaining bore in a split-type bearing housing comprised of the housing halves 14, 16, and further, a slight positional deviation is also incurred at the abutting end faces of the housing halves 14, 16 when the housing halves 14, 16 (the split surfaces of the split-type bearing housing) are mated with each other by fastening bolts after the semi-cylindrical bearings 20D, 22C are fitted in the split-type bearing housing. Thus, there would be possibly caused a stepped difference (g) of about 5 μm at maximum in the radial direction between the pair of semi-cylindrical bearings 20D, 22C at the abutting end faces thereof on one side.

FIG. 5 shows the semi-cylindrical bearings 20D, 22C in the condition that the stepped difference (g) is caused between the inner surfaces thereof at the abutting end faces thereof since the abutting end faces of the housing halves 14, 16 (the split surfaces of the split-type bearing housing) are positionally deviated from each other when the housing halves 14, 16 are mated with each other by fastening the bolts. FIG. 7 is an enlarged view illustrating a portion A indicated in FIG. 5, in which the stepped difference of the semi-cylindrical bearings 20D, 22C is formed, and also illustrating the crankshaft 30.

The semi-cylindrical bearings 20D, 22C have the same configurations as those of the semi-cylindrical bearings 20B, 22 explained in the embodiment 3 (refer to FIG. 3), except that multi circumferential grooves 20d, 22d are formed in the inner surfaces thereof. The circumferential grooves 20d, 22d preferably has a circular-arc cross-sectional shape as shown in FIG. 8 in which reference mark H denotes the depth of the circumferential grooves 20d, 22d. As the stepped difference (g) which is a part of the abutting end face of the semi-cylindrical bearing 20D is viewed in the direction of the arrow B indicated in FIG. 7, the cross-sectional shape of the circumferential grooves 20d can be seen, being opened at the abutting end face.

Even though the stepped difference having 5 μm is caused between the inner surfaces of the semi-cylindrical bearings 20D, 22C at the abutting end faces thereof, if the circumferential grooves 20d, 22d having a depth of 5 to 20 μm are formed in the inner surfaces, the lubrication oil flowing in the rotating direction of the crankshaft (the arrow X in FIG. 7) can smoothly flow into and through the circumferential grooves 20d without being hindered by the stepped difference (g) caused at the abutting end face of the semi-cylindrical bearing 20D since the depth of the circumferential grooves is approximately equal to or greater than the size of the stepped difference (g). Thus, it is possible to prevent occurrence of a wiping event caused by the stepped difference (g) in success.

On the other hand, in the case that no circumferential grooves are formed in the inner surface of the semi-cylindrical bearing, the stepped difference caused at the abutting end face of the semi-cylindrical bearing becomes a barrier blocking the path of the lubrication oil flowing in the rotating direction of the crankshaft, resulting in occurrence of the wiping event as to the lubrication oil due to the stepped difference. As a result, the lubrication oil which has come to the stepped difference readily flows widthwise of the bearing along the stepped difference, and accordingly, sufficient supply of lubrication oil cannot be ensured.

Explanation has been hereinabove made of such that the depths (H) of the circumferential grooves 20d, 22d are set to be not less than 20 μm. The reason why the depth is limited to the value, is such that should the depth exceed 20 μm, an oil film could hardly be formed on the sliding surface of the circumferentially center part of the semi-cylindrical bearing, which mainly bears a dynamic load during operation of the internal combustion engine. The depth of the circumferential grooves is more preferably in a range from 10 to 15 μm.

Further, the circumferential grooves formed in the inner surface of the semi-cylindrical bearing have pitches which are 0.3 to 1.5 mm in the widthwise direction of the bearing. It is because should the pitches be less than 0.3 mm, the sectional area of each of the crests of ridges which define therebetween the circumferential grooves would becomes excessively small so as to be readily worn, being made into contact with the crankshaft, and the larger the degree of abrasion, the larger the bearing clearance, would result in an increase in the amount of leakage of lubrication oil, and meanwhile should the pitches of the circumferential grooves exceed 1.5 mm, the number of the ridges in the widthwise direction of the bearing, which bears a load from the crankshaft would become less, and accordingly, the load received by each of the crests of the ridges would become higher, and accordingly, the material strength of the semi-cylindrical bearing would be reduced by frictional heat, resulting in an increase in the degree of abrasion. In order to reduce the abrasion of the semi-cylindrical bearing, the pitches of the circumferential grooves are more preferably in a range from 0.5 to 1.5 mm in the widthwise direction of the bearing.

Although the circumferential grooves 20d, 22d formed in the semi-cylindrical bearings 20D, 22C are extended over the entire surfaces thereof, they may be formed only in zones which has a range of a circumferential length corresponding to a predetermined circumferential angle measured from the respective circumferential end surfaces of the semi-cylindrical bearings 20D, 22C, as a starting point, on the side where the stepped difference (g) facing in the direction opposite to the rotating direction of the crankshaft is present.

It is noted that the circumferential grooves 20d, 22d preferably have a circular-arc cross-sectional shape as shown in FIG. 8. However, they may have a V-like cross-sectional shape.

If the circumferential grooves have a circular-arc cross-sectional shape, not less than about ⅔ of the area of the stepped difference which is a part of the abutting end face of the semi-cylindrical bearing is occupied by the spaces in the circumferential grooves through which the lubrication oil flows. That is, there can be obtained a technical effect corresponding to the reduction of the degree of the stepped difference (g in FIG. 7) to a value that is substantially not greater than ⅓ thereof.

If the circumferential grooves have a V-like cross-sectional shape, not less than about ½ of the area of the stepped difference which is a part of the abutting end face of the semi-cylindrical bearing is occupied by the spaces in the circumferential grooves through which the lubrication oil flows, that is, there can be obtained a technical effect corresponding to the reduction of the degree of the stepped difference (g in FIG. 7) to a value that is substantially not greater than ½.

In order to form the circumferential grooves, a cutting tool having a circular-arc shape edge or a V-like shape edge is used so as to transfer the shape of the edges of the cutting tool in the inner surface of the semi-cylindrical bearing by lathing.

[Embodiment 5]

Explanation will be hereinbelow made of another example of the semi-cylindrical bearing having circumferential grooves with another configuration, as shown in FIG. 6. The semi-cylindrical bearings 20E, 20D shown in FIG. 6 have configurations similar to that of the semi-cylindrical bearings 20D, 22C shown in FIG. 5, except that the range in which the circumferential grooves 20e, 22e are formed is different from that explained in the embodiment shown in FIG. 5. That is, the circumferential grooves 20e, 22e are formed in a range of a circumferential length corresponding to a circumferential angle of at least 10 deg. But 50 deg. at maximum, measured from the circumferential end faces of the semi-cylindrical bearings 20E, 22D, as a starting point. With this configuration, similar to the configuration of the embodiment 4, it is possible to effectively prevent occurrence of a wiping event as to the lubrication oil even thought a stepped difference is caused at the circumferential end face of the semi-cylindrical bearing.

Further, in the zones of the inner surfaces of the semi-cylindrical bearings where no circumferential grooves 20e, 22e are formed, the inner surface of each of the semi-cylindrical bearings has a degree of surface roughness which is set to be not higher than 3.2 μm that is usual in a split-type sliding bearing for a crankshaft. With this degree of surface roughness, an oil film can be readily formed on the sliding surface of the circumferentially center part of the semi-cylindrical bearing, which is the main load bearing part of the semi-cylindrical bearing, thereby it is possible to ensure the slidng bearing having a sufficient load capacity.

The invention claimed is:

1. A split-type sliding bearing for a crankshaft in an internal combustion engine, comprised of a pair of semi-cylindrical bearings which are mated with each other into a cylindrical body in use, and adapted to be fitted in a split-type bearing housing having a cylindrical bearing retaining bore which is bi-split so as to be aligned with the pair of semi-cylindrical bearings in the mated condition, wherein:

the split-type bearing housing is composed of a housing half having a higher thermal expansion coefficient, and a housing half having a low thermal expansion coefficient in a preinstalled condition, a first semi-cylindrical bearing which is one of the pair of semi-cylindrical bearings, and which is supported on the housing half having the higher thermal expansion coefficient, and a second semi-cylindrical bearing which is the other one of the pair of semi-cylindrical bearings, and which is supported on the housing half having the lower expansion coefficient, have the following dimensional relationship in the preinstalled condition:

(1) the first and second semi-cylindrical bearings have an equal outer diameter, and (2) opposite circumferential end parts of the first semi-cylindrical bearing have a thickness which is larger than that of opposite circumferential end parts of the second semi-cylindrical bearing;

whereby the inner surfaces of the first semi-cylindrical bearing and the second semi-cylindrical bearing are aligned with each other at abutting end faces of both semi-cylindrical bearings in an installed condition upon thermal expansion of both housing halves resulting in a stepped difference due to a difference between degrees of thermal expansion of both housing halves, when the temperature of the housing halves are increased during operation of the internal combustion engine.

2. The split-type sliding bearing for the crankshaft in the internal combustion engine as set forth in claim 1, wherein the first semi-cylindrical bearing has a thickness which is uniform over the entire circumferential length thereof.

3. The split-type sliding bearing for the crankshaft in the internal combustion engine as set forth in claim 1, wherein the first semi-cylindrical bearing has a thickness which is increased from the circumferential center part to the circumferential end faces thereof.

4. The split-type sliding bearing for the crankshaft in the internal combustion engine as set forth in claim 1, wherein the second semi-cylindrical bearing has a thickness which is uniform over the entire circumferential length thereof.

5. The split-type sliding bearing for the crankshaft in the internal combustion engine as set forth in claim 1, wherein the second semi-cylindrical bearing has a thickness which is decreased from the circumferential center part to the circumferential end faces thereof.

6. The split-type sliding bearing for the crankshaft in the internal combustion engine as set forth in claim 1, wherein at least the second semi-cylindrical bearing has multi circumferential grooves formed in an inner surface thereof and extended circumferentially thereof, and the circumferential grooves formed in circumferential end zones of the second semi-cylindrical bearing, which respectively include two circumferential end faces of the second semi-cylindrical have a depth from 5 to 20 μm.

7. The split-type sliding bearing for the crankshaft in the internal combustion engine as set forth in claim 6, wherein the circumferential end zones of the inner surface have a range defined by a circumferential length corresponding to a circumferential angle of at least 10 deg. but 50 deg. at maximum, measured from the circumferential end faces as a starting point.

8. The split-type sliding bearing for the crankshaft in the internal combustion as set forth in claim 7, wherein the inner surface has a degree of surface roughness which is not greater than 3.2 μmRz, except the circumferential end zones.

9. The split-type sliding bearing for the crankshaft in the internal combustion engine as set forth in claim 6, wherein the circumferential grooves have pitches from 0.3 to 1.5 mm.

10. The split-type sliding bearing for the crankshaft in the internal combustion engine as set forth in claim 6, wherein the depth of the circumferential grooves formed in the inner surface of the second semi-cylindrical bearing is equal to or greater than the degree of a stepped difference caused between the abutting end surfaces of the first and second semi-cylindrical bearings.

11. The split-type sliding bearing for the crankshaft in the internal combustion engine as set forth in claim 6, wherein the first semi-cylindrical bearing has multi circumferential grooves formed in an inner surface thereof and extended circumferentially thereof, and the circumferential grooves which are formed in circumferential end zones which respectively include two circumferential end faces of the first semi-cylindrical bearing have a depth from 5 to 20 μm.

12. The split-type sliding bearing for the crankshaft in the internal combustion engine as set forth in claim 11, wherein the circumferential end zones of the first semi-cylindrical bearing have a range which is defined by a circumferential length corresponding to a circumferential angle which is at least 10 deg. but 50 deg. at maximum, measured from the circumferential end surfaces as a stating point.

13. The split-type sliding bearing for the crankshaft in the internal combustion engine as set forth in claim 12, wherein the inner surface of the first semi-cylindrical bearing has a degree of surface roughness which is not higher than 3.2 μmRz, except the circumferential end zones.

14. The split-type sliding bearing for the crankshaft in the internal combustion engine as set forth in claim 11, wherein the circumferential grooves formed in the first semi-cylindrical bearing have pitches which is 0.3 to 1.5 mm.

15. A split-type sliding bearing device for a crankshaft in an internal combustion engine, comprising:
a split-type sliding bearing for a crankshaft in an internal combustion engine, comprised of a pair of semi-cylindrical bearings which are mated with each other into a cylindrical body in use, and
a split-type bearing housing having a cylindrical bearing retaining bore which is bi-split so as to be aligned with the pair of semi-cylindrical bearings in the mated condition, for accommodating and retaining the pair of semi-cylindrical bearings in the bearing retaining bore, wherein
the split-type bearing housing is comprised of a housing half having a higher thermal expansion coefficient, and a housing half having a lower thermal expansion coefficient,
a first semi-cylindrical bearing which is one of the pair of semi-cylindrical bearings, and which is supported on the housing half having a the higher thermal expansion coefficient, and a second semi-cylindrical bearing which is the other one of the pair of semi-cylindrical bearings, and which is supported on the housing half having a the lower expansion coefficient, have the following dimensional relationship in a preinstalled condition:
(1) the first and second semi-cylindrical bearings have an equal outer diameter, and
(2) opposite circumferential end parts of the first semi-cylindrical bearing have a thickness which is larger than that of opposite circumferential end parts of the second semi-cylindrical bearing;
whereby the inner surfaces of the first semi-cylindrical bearing and the second semi-cylindrical bearing are aligned with each other at abutting end faces of both semi-cylindrical bearings in an installed condition upon thermal expansion of both housing halves resulting in a stepped difference due to a difference between degrees of thermal expansion of both housing halves, when the temperature of the housing halves are increased during operation of the internal combustion engine.

16. The split-type sliding bearing device for the crankshaft in the internal combustion engine as set forth in claim 15, wherein the first semi-cylindrical bearing has a thickness which is uniform over the entire circumferential length thereof.

17. The split-type sliding bearing device for the crankshaft in the internal combustion engine as set forth in claim 15, wherein the first semi-cylindrical bearing has a thickness which is increased from the circumferential center part to the circumferential end faces thereof.

18. The split-type sliding bearing device for the crankshaft in the internal combustion engine as set forth in claim 15, wherein the second semi-cylindrical bearing has a thickness which is uniform over the entire circumferential length thereof.

19. The split-type sliding bearing device for the crankshaft in the internal combustion engine as set forth in claim 15, wherein the second semi-cylindrical bearing has a thickness which is decreased from the circumferential center part to the circumferential end faces thereof.

20. The split-type sliding bearing device for the crankshaft in the internal combustion engine as set forth in claim 15, wherein at least the second semi-cylindrical bearing has multi circumferential grooves formed in an inner surface thereof and extended circumferentially thereof, and the circumferential grooves formed in circumferential end zones of the second semi-cylindrical bearing, which respectively include two circumferential end faces of the second semi-cylindrical have a depth from 5 to 20 μm.

21. The split-type sliding bearing device for the crankshaft in the internal combustion engine as set forth in claim 20, wherein the circumferential end zones of the inner surface has a range defined by a circumferential length corresponding to a circumferential angle of at least 10 deg. but 50 deg. at maximum, measured from the circumferential end faces as a starting point.

22. The split-type sliding bearing device for the crankshaft in the internal combustion as set forth in claim 21, wherein the inner surface has a degree of surface roughness which is not greater than 3.2 μmRz, except the circumferential end zones.

23. The split-type sliding bearing device for the crankshaft in the internal combustion engine as set forth in claim 20, wherein the circumferential grooves have pitches from 0.3 to 1.5 mm.

24. The split-type sliding bearing device for the crankshaft in the internal combustion engine as set forth in claim 20, wherein the depth of the circumferential grooves formed in the inner surface of the second semi-cylindrical bearing is equal to or greater than the degree of a stepped difference caused between the abutting end surfaces of the first and second semi-cylindrical bearing.

25. The split-type sliding bearing device for the crankshaft in the internal combustion engine as set forth in claim 20, wherein the first semi-cylindrical bearing has multi circumferential grooves formed in an inner surface thereof and extended circumferentially thereof, and the circumferential grooves which are formed in circumferential end zones of the inner surface of the first semi-cylindrical bearing, which respectively include two circumferential end faces of the first semi-cylindrical bearing have a depth from 5 to 20 μm.

26. The split-type sliding bearing device for the crankshaft in the internal combustion engine as set forth in claim 25, wherein the circumferential end zones of the first semi-cylindrical bearing have a range which is defined by a circumferential length corresponding to a circumferential angle which is at least 10 deg. but 50 deg. at maximum, measured from the circumferential end surfaces as a stating point.

27. The split-type sliding bearing device for the crankshaft in the internal combustion engine as set forth in claim 26, wherein the inner surface of the first semi-cylindrical bearing has a degree of surface roughness which is not higher than 3.2 μmRz, except the circumferential end zones.

28. The split-type sliding bearing device for the crankshaft in the internal combustion engine as set forth in claim 25, wherein the circumferential grooves formed in the first semi-cylindrical bearing have pitches which is 0.3 to 1.5 mM.

* * * * *